United States Patent [19]

Coutant et al.

[11] Patent Number: 5,292,544
[45] Date of Patent: Mar. 8, 1994

[54] TRICALCIUM PHOSPHATE TO GENERATE SMOOTHNESS AND OPAQUENESS IN REDUCED FAT LIQUID FOOD PRODUCTS AND METHOD

[75] Inventors: Antoine F. Coutant, Jersey City; Philip Wong, Kendall Park, both of N.J.

[73] Assignee: Rhone-Poulenc Specialty Chemicals Co., Cranbury, N.J.

[21] Appl. No.: 984,155

[22] Filed: Dec. 2, 1992

Related U.S. Application Data

[63] Continuation-in-part of Ser. No. 818,690, Jan. 7, 1992, abandoned.

[51] Int. Cl.⁵ .......................... A23L 1/05; A23C 9/154
[52] U.S. Cl. ..................................... 426/573; 426/267; 426/575; 426/578; 426/580; 426/611; 426/654; 426/804

[58] Field of Search ............... 426/267, 573, 575, 578, 426/580, 611, 654, 804

[56] References Cited

U.S. PATENT DOCUMENTS

| | | | |
|---|---|---|---|
| 3,692,543 | 9/1972 | Powell | 99/144 |
| 3,968,263 | 7/1976 | Reussner | 426/250 |
| 4,701,329 | 10/1987 | Nelson et al. | 426/74 |
| 4,713,255 | 12/1987 | Horan et al. | 426/589 |
| 4,891,198 | 1/1990 | Ackilli et al. | 423/308 |
| 5,063,074 | 11/1991 | Kahn et al. | 426/585 |
| 5,145,698 | 9/1992 | Cajigas | 426/43 |

*Primary Examiner*—Helen F. Pratt
*Attorney, Agent, or Firm*—John A. Shedden

[57] ABSTRACT

A low fat, very low fat or fat-free emulsion-simulating food product is prepared by adding tricalcium phosphate to develop an opaqueness and smoothness in the food and to reduce gloppiness in foods containing gum, especially xanthan.

14 Claims, No Drawings

TRICALCIUM PHOSPHATE TO GENERATE SMOOTHNESS AND OPAQUENESS IN REDUCED FAT LIQUID FOOD PRODUCTS AND METHOD

This application is a continuation-in-part of Ser. No. 818,690, filed Jan. 7, 1992, now abandoned.

The present invention relates to a method of treating food to realize emulsion-simulating food products and more particular with treating low fat, very low fat or fat-free dressings, milk products and the like with tricalcium phosphate to improve the opacity of the food, to give an improved smoother texture and to prevent stringiness or gloppiness present in many such food products employing gums.

DESCRIPTION OF THE PRIOR ART

Tricalcium phosphate has been used in acidic fruit beverages in U.S. Pat. No. 3,968,263 to prevent tooth demineralization and in U.S. Pat. No. 4,891,198 as a dry fruit beverage ingredient. In U.S. Pat. No. 3,692,543, tricalcium phosphate is used as an emulsifier to replace egg in high fat food products such as mayonnaise or mayonnaise-type dressing. In the "543" patent, the tricalcium phosphate helps retain the emulsified character of fat-containing products at elevated temperature and stabilizes the resulting salad dressings under freeze-thaw conditions.

SUMMARY OF THE INVENTION

The addition of a small but effective amount of tricalcium phosphate provides improved opacity, smoothness and reduced gloppiness in gum-containing low fat, very low fat or fat-free products designed to simulate the appearance of normally fat-containing emulsified food products. Thus, fat-free salad dressing or fat-free milk products or other fat-free foods can be improved by the addition of the tricalcium phosphate to either a dry or aqueous gum-containing product reconstituted or not, especially those containing hydrocolloids used as fat mimetics. The tricalcium phosphate in an aqueous food provides an opaqueness reminiscent of an oil in water emulsion in foods such as salad dressings, ice cream, ice milk products, fat-free milk products and the like. Surprisingly, the tricalcium phosphate also improves the smoothness of the product and prevents gloppiness when gums or other substances such as fat mimetics are used, particularly in salad dressings.

DETAILED DESCRIPTION OF THE INVENTION

By emulsion-simulating food products is meant liquid food products in which the fat (or oil which term is herein used synonymously with the term fat) globules which are dispersed in the continuous phase of the emulsion are substantially reduced and/or replaced by a fat replacing system containing at least one fat mimetic additive.

By gloppiness is meant a defect generally found in reduced fat liquid food products using gums, which cause these products to pour unevenly, for example, in lumps, exhibiting a "gloppy flow".

The addition of a small but effective amount of tricalcium phosphate to a fat-free, very low fat or a low fat liquid food containing a major amount of water and a gum thickener such as xanthan produces the appearance and smoothness of an emulsified oil-in-water emulsion. Moreover and surprisingly, the addition of tricalcium phosphate virtually eliminates the gloppiness exhibited by these gum-containing liquid food products.

By fat-free food is meant any aqueous food emulsion product containing less than 0.5 grams of fat per one hundred grams (100 grams) of emulsion product; preferably no fat except for trace quantities. Trace quantities of fat can be introduced by some of the vegetables and spices employed in salad dressings.

By very low fat food is meant any aqueous food emulsion product containing in the range of between 0.5 grams to 2 grams of fat per one hundred grams (100 grams) of emulsion product.

By low fat food is meant any aqueous food emulsion product containing less than 50% of the fat content that usually is present in the regular, natural food product and as such, preferably contains fat in the range of from less than 9 grams to more than 2 grams of fat per one hundred grams (100 grams) of emulsion product.

Products may be a dry mix to which the consumer adds ingredients. Normally, the dry mix would require only the addition of mainly water, vinegar, and eventually spices, skim milk or other fat-free or low fat food ingredient.

The essence of this invention is the discovery that the addition of a small but effective amount of tricalcium phosphate is extremely useful in low fat, very low fat or fat-free products where gums are employed for their thickening and/or fat mimetic properties. With very low fat, low fat and fat-free products, there currently exists texture problems. For instance, when gums are added for their thickening properties, one can achieve a highly viscous, stable, pourable suspension; however, such systems also tend to be stringy and gloppy. When starches are added, one can achieve a highly viscous suspension; however, at high starch loadings, the systems tend to set up, i.e. become non-pourable, while at lower loadings which permit the compositions to pour, the suspension becomes unstable,, i.e. tends to settle out.

We have found that when tricalcium phosphate is added to emulsion-simulating liquid food products containing gum, the tricalcium phosphate completely masks the stringiness and gloppiness of the food by providing an opaque, smooth non-gloppy pourable product with a substantially improved mouthfeel.

Fat mimetic additives are well known in the art and may include starches, starch maltodextrin obtained from potato, corn, tapioca or any available starch source, water soluble cereal dietary fiber composition such as described in U.S. Pat. Nos. 4,996,063 and 5,082,673. The fat mimetic includes such known fat replacements as dispersed aqueous gelled beads of average diameter of 5 to 100 microns prepared from proteins, grains, starch or gelled polysaccharides and which are coated with lipophilic material as disclosed in U.S. Pat. No. 4,305,964, U.S. Pat. No. 4,305,970, and U.S. Pat. No. 4,515,825 to Moran, et al. Cellulose gels having aggregates of one micron or less to reduce calories as disclosed in U.S. Pat. No. 3,023,104 or hydrocolloids as disclosed in U.S. Pat. No. 3,573,058. The fat mimetic material may also include protein particles of no more than 5 microns used to make low fat spreads as disclosed in U.S. Pat. No. 4,103,037.

Other useful fat mimetics include water dispersible colloidal carbohydrate particles effective to impart the characteristic of oil in water emulsions. The carbohydrates include starches with lecithin and xanthan used to stabilize the colloidal particles and prevent aggregation and are disclosed in U.S. Pat. No. 4,911,946. The work is similar to earlier work disclosed in U.S. Pat. No. 4,734,287 which employed albumin or dairy whey protein as a fat substitute.

The fat mimetics are usually added in somewhat less amounts than the fat content of the product being simulated, most often up to 15%; preferably in the range of from 0.1% to 10%.

Gums are also well known in the food art and may include water soluble or dispersible cellulose gum, pectinates, alginates, carrageenan, xanthan, guar gum, locust bean gum and the like. Gums are normally used in very low fat, low fat and fat-free food products in much lower amounts than fat mimetics because of their viscosity effect. For salad dressings, from 0.1% up to 5%, preferably from 0.2% to 2% xanthan or other gums are used.

Preservatives are added such as potassium sorbate or others as necessary to maintain the food in a stable, good tasting condition.

As mentioned above, the addition of tricalcium phosphate (TCP) improves the smoothness, i.e. eliminates gloppiness and stringiness of the gum-containing simulated or apparent emulsion for some unknown reason and substantially improves the mouthfeel of the food.

The tricalcium phosphate can be used in any small but effective amount which will produce the desired opacity, smoothness and prevention of gloppiness without contributing an off-taste to the food. Usually from greater than 1% to 10% by weight based on the finished aqueous product is more than sufficient with from 1.2% to 5% preferred and from 1.5% to 3% most preferred. For salad dressings containing gums such as xanthan and/or propylene glycol alginate, 1.8% to 2.8% TCP in the finished fat-free dressing is optimum.

In low fat, very low fat and fat-free emulsion simulating foods, we employ up to 95% water, preferably at least 50% water, more preferably from 50% to 90%, and most preferably from 60% to 80% water.

For salad dressings, the water content should be mainly obtained from water and/or food grade acid. The salad dressings should contain at least 20%, preferably 25% to 95% water and most preferably 35% to 75% water.

The food can contain other ingredients such as natural or intensive sweeteners up to 40%, preferably up to 25% and most preferably from 3% to 20% mono or disaccharide especially high fructose corn syrups and sucrose and/or small but effective amounts of intensive sweeteners such as aspartyl phenyl alanine methyl ester, saccharin, acetylsulfam K or any food acceptable, compatible intense sweetener.

Flavorants such as vanilla or chocolate, salt, pepper, mustard tomato paste, onion powder, paprika, garlic and the like may be employed in their art recognized amounts depending on the food emulsion product being simulated.

As a measure of salad dressing quality, we use viscosity measurements. $V_1$ and $V_2$ are a viscosity measurement made using a model LVT Brookfield viscometer operating at 12 rpm. The method characterizes gloppiness with the wider the viscosity difference, the more gloppy the salad dressing. The method is performed as follows:

1. Adjust salad dressing temperature to 25°±° C.
2. Pour 200 ml of salad dressing into a 250 ml glass beaker.
3. Using a model LVT Brookfield Viscometer at 12 RPM, lower the spindle down to the notch. (Select the appropriate spindle to give readings as near to midrange as possible.)
4. Record the first reading at the end of the first complete rotation of the spindle ($V_1$) and again one minute later ($V_2$).
5. The wider the difference between $V_1$ and $V_2$, the more gloppy the dressing.

The invention is further described by the following examples which are not intended to limit the invention in any way.

EXAMPLE 1

No Fat French Dressing

Water was measured into a mixing tank and potassium sorbate added and mixed in. Cane sugar was then added and mixed for five minutes. A gum blend of tricalcium phosphate, Staley Mira Thick 468 and xanthan gum were added in. Tomato paste and oleoresin paprika were dispersed in vinegar and added. All remaining ingredients were blended and well mixed. The mixture was then homogenized in a homogenizer* at 2000 psig. Two formulas were prepared from ingredients listed hereinafter. Formula 1 was spicy hot. Both formulas were opaque and very smooth, resembling a french dressing containing oil.

*Microfluidics Corp., Model HC 5000. A Cherry Burrell or a Manton Gaulin Homogenizer can be used with comparable results.

| Formula for gum blend: | |
|---|---|
| Tricalcium Phosphate | 55% |
| Staley Mira Thik #468** | 30% |
| Rhodigel Brand Xanthan*** | 15% |

| Dressing Formula: | | |
|---|---|---|
| | Formula 1 % By Weight | Formula 2 % By Weight |
| Cider Vinegar (40 grain) | 40.0 | 40.0 |
| Water | 34.8 | 35.0 |
| Cane Sugar | 15.0 | 15.0 |
| Gum Blend | 3.5 | 3.5 |
| Tomato Paste | 3.0 | 3.0 |
| Salt | 1.5 | 1.5 |
| Mustard Flour | 0.8 | 0.8 |
| Onion Powder | 0.8 | 0.8 |
| White Pepper | 0.2 | — |
| Oleoresin Paprika | 0.2 | 0.2 |
| Garlic Powder | 0.1 | 0.1 |
| Potassium Sorbate | 0.1 | 0.1 |
| Viscosity | | |
| $V_2$ | 5700 CPS | 5700 CPS |
| $V_2$ | 5500 CPS | 5700 CPS |

**Staley Mira Thik #468 is a trademark of Staley for modified food starch.
***Rhodigel is a trademark for xanthan sold by Rhone-Poulenc.

EXAMPLE 2

A comparison of French Dressing was made with and without tricalcium phosphate. The dressing was prepared as in Example 1 except that the xanthan was dry blended with cane sugar in preparing Formulas 1, 2, and 3, and the tricalcium phosphate was added after homogenization in Formula 2 and before homogenization in Formula 3.

| | Formulas: | |
|---|---|---|
| | 1 % By Weight | 2 % By Weight |
| Cider Vinegar (50 grain) | 32.0 | 32.0 |
| Water | 45.7 | 43.7 |
| Cane Sugar | 15.0 | 15.0 |
| Tomato Paste | 3.0 | 3.0 |

-continued

| | Formulas: | |
|---|---|---|
| | 1 % By Weight | 2 % By Weight |
| Salt | 1.5 | 1.5 |
| Mustard Flour | 0.8 | 0.8 |
| Onion Powder | 0.8 | 0.8 |
| Oleoresin Paprika | 0.2 | 0.2 |
| Garlic Powder | 0.1 | 0.1 |
| Potassium Sorbate | 0.1 | 0.1 |
| Xanthan | 0.8 | 0.8 |
| Tricalcium Phosphate | — | 2.0 |
| Viscosity | | |
| $V_1$ | 7700 CPS | 7100 CPS |
| $V_2$ | 6900 CPS | 7100 CPS |

Formula 1 was found to be very gloppy while Formula 2 and Formula 3 were very smooth.

EXAMPLE 3

French dressings were prepared as in Example 2 using the processing of Formula 3 with levels of tricalcium phosphate varying from zero to 2.0% by weight of the total composition with the following results:

| % TCP | $V_1$ | $V_2$ | ΔV | Appearance |
|---|---|---|---|---|
| 0 | 5300 | 4800 | 500 | Dark Red |
| 0.5 | 5200 | 4700 | 500 | Dark Red |
| 1.0 | 5100 | 4800 | 300 | Moderately Dark Red |
| 1.5 | 5100 | 5000 | 100 | Lighter Opaque Red |
| 2.0 | 5200 | 5200 | 0 | Lightest Opaque Red |

Since the larger the difference in viscosity measurements, the more gloppiness is realized in the product, the above data shows that the tricalcium phosphate (TCP) addition begins to become effective above about 1% TCP and reaches full effectiveness at about 2% TCP. The physical appearance is also an indication of when the TCP addition begins to take effect for opaqueness becomes evident after 1% TCP was added.

EXAMPLE 4

| | French Dressing | | |
|---|---|---|---|
| | Formulas: | | |
| | 1 % By Weight | 2 % By Weight | 3 % By Weight |
| Cider Vinegar (40 grain) | 30.0 | 25.0 | 30.0 |
| Water | 39.9 | 45.9 | 41.4 |
| Cane Sugar | 15.0 | 15.0 | 15.0 |
| Tomato Paste | 3.0 | 3.0 | 3.0 |
| Tricalcium Phosphate | 3.0 | 2.0 | 2.0 |
| Soybean Oil | 3.0 | 3.0 | 3.0 |
| Oatrim water soluble dietary fiber composition | 2.0 | 2.0 | 2.0 |
| Salt | 1.5 | 1.5 | 1.5 |
| Mustard Flour | 0.8 | 0.8 | 0.4 |
| Onion Powder | 0.8 | 0.8 | 0.8 |
| Xanthan | 0.5 | 0.5 | 0.5 |
| White Pepper | 0.2 | 0.1 | — |
| Potassium Sorbate | 0.1 | 0.1 | 0.1 |
| Garlic Powder | 0.1 | 0.1 | 0.1 |
| Oleoresin Paprika | 0.1 | 0.2 | 0.2 |
| Viscosity | | | |
| $V_1$ | 4900 CPS | 4900 CPS | 4800 CPS |
| $V_2$ | 4900 CPS | 4900 CPS | 4800 CPS |

OATRIM ... A trademark of Rhone-Poulenc for a water soluble dietary fiber composition described in U.S. Pat. Nos. 4,996,063 and 5,082,673.

The dressing was prepared as Example 1 except that Oatrim, xanthan and tricalcium phosphate were added in place of the gum blend.

Evaluation of the above three formulas found Formula 1 to be too spicy, somewhat whiter than desirable and very creamy. Formula 2 was found to be too sweet and still too spicy, but of good texture. Formula 3 was found to be of good texture, taste and color. It was also observed that the addition of the Oatrim enhanced the oil characteristics of the salad dressing.

EXAMPLE 5

| | Thousand Island Dressing | |
|---|---|---|
| | Formulas: | |
| | 1 % By Weight | 2 % By Weight |
| Water | 34.56 | 47.527 |
| Cider Vinegar (40 grain) | 25.00 | — |
| Distilled Vinegar (100 grain) | — | 12.000 |
| Sweet Relish | 15.00 | 15.000 |
| Cane Sugar | 15.00 | 15.000 |
| Tomato Paste | 5.00 | 5.000 |
| Gum Blend as in Example 1 | 3.50 | 4.000 |
| Salt | 1.00 | 1.000 |
| Minced Onion | 0.40 | — |
| Mustard Flour | 0.30 | 0.300 |
| White Pepper | 0.10 | 0.050 |
| Potassium Sorbate | 0.10 | 0.100 |
| Onion Powder | 0.01 | 0.010 |
| Garlic Powder | 0.01 | 0.010 |
| Oleoresin Paprika | 0.02 | 0.003 |

The formulas were prepared as in Example 1 except that minced onion and relish were not added until after homogenization.

Taste observations were that the Formula 1 was too red and not thick enough while Formula 2 had good taste, color and texture.

EXAMPLE 6

| | Ranch Dressing | |
|---|---|---|
| | Formulas: | |
| | 1 % By Weight | 2 % By Weight |
| Water | 63.6 | 62.1 |
| Buttermilk Powder | 15.0 | — |
| Non-fat Dry Milk | — | 15.0 |
| Distilled Vinegar (100 grain) | 12.0 | 12.0 |
| Gum Blend as in Example 1 | 2.0 | 3.5 |
| Sucrose | 4.0 | 4.0 |
| Salt | 1.0 | 1.0 |
| Onion Powder | 1.0 | 1.0 |
| Monosodium Glutamate | 0.5 | 0.5 |
| Garlic Powder | 0.5 | 0.5 |
| Celery Powder | 0.1 | 0.1 |
| Green Onion Flakes | 0.1 | 0.1 |
| White Pepper | 0.1 | 0.1 |
| Potassium Sorbate | 0.1 | 0.1 |
| Viscosity | | |
| $V_1$ | 3000 CPS | 7500 CPS |
| $V_2$ | 3000 CPS | 7500 CPS |

The formulas were prepared as in Example 1 except that celery powder and green onion flakes were added after homogenization.

Taste evaluation found that Formula 1 was not thick enough. Formula 2 with increased amount of gum blend was found to have good taste, texture and color.

EXAMPLE 7

| Fat-Free Italian Dressing | |
|---|---|
| | % By Weight |
| Water | 69.27 |
| Distilled Vinegar (100 grain) | 16.00 |
| Cane Sugar | 8.00 |
| Salt | 1.50 |
| Gum Blend as in Example 1 | 4.00 |
| Xanthan | 0.20 |
| Minced Garlic | 0.40 |
| Garlic Powder | 0.30 |
| Potassium Sorbate | 0.10 |
| Onion Powder | 0.10 |
| Red Pepper Flakes | 0.05 |
| Whole Oregano | 0.03 |
| Tartrazine Solution (1%) | 0.03 |
| Whole Sweet Basil | 0.01 |
| Red 40 Solution (1%) | 0.01 |
| Viscosity | |
| $V_1$ | 7200 CPS |
| $V_2$ | 7200 CPS |

The formula was prepared as in Example 1 except that minced garlic, red pepper flakes, whole oregano and whole sweet basil were added after homogenization.

The fat-free dressing was found to be just right with very good texture and color. Taste and opacity of the dressing was like a high oil product with no "gloppiness".

EXAMPLE 8

| Fat-Free Milk Shake | | |
|---|---|---|
| | Formulas: | |
| | 1 | 2 |
| | % By Weight | % By Weight |
| Water | 70.0 | 68.0 |
| Tricalcium Phosphate | — | 2.0 |
| Non-Fat Milk Solids | 13.0 | 13.0 |
| Corn Syrup Solids | 12.0 | 12.0 |
| Xanthan Gum Rhodigel Bran | 0.6 | 0.6 |
| Vanilla | 0.4 | 0.4 |
| Viscosity | | |
| $V_1$ | 5400 CPS | 6500 CPS |
| $V_2$ | 5000 CPS | 6500 CPS |
| Physical | Gloppy | Smooth |

The formulas were prepared by metering water into a mixing tank and beginning agitation. The vanilla is added and a dry mix of the remaining ingredients added slowly into the tank and mixed until smooth.

Despite the higher viscosity, Formula 2 is very smooth and not gloppy, whereas Formula 1 is gloppy. Furthermore, Formula 2 was significantly creamier and whiter than Formula 1.

We claim:

1. A method of preparing smooth low fat, very low fat or fat-free emulsion-simulating food products with opaque appearance and non-gloppy texture from a low fat, vary low fat or fat-free emulsion-simulating food products mixture having up to 15% fat mimetic additive and from 0.1 to 5% gum, comprising
   homogenizing said mixture; and
   adding to the mixture, either before or after said homogenizing, from greater than 1% to 10% tricalcium
   phosphate;
   all of the above percentages based on the total weight of said food product.

2. The method of claim 1 wherein said food product is fat-free.

3. The method of claim 2 wherein the food product has up to 10% fat mimetic additive and the amount of tricalcium phosphate added is from 1.2% to 5.0%.

4. The method of claim 2 wherein the food product contains from 50% to 95% water based on the total product.

5. The method of claim 2 wherein the food product is an emulsion-simulated dairy product.

6. The method of claim 2 wherein the food product is a salad dressing.

7. The method of claim 2 wherein the said fat mimetic comprises a water soluble dietary fiber composition.

8. The method of claim 1 wherein the food product has up to 10% fat mimetic additive and the amount of tricalcium added is from 1.2% to 5.0%.

9. The method of claim 1 wherein the food product contains from 50% to 95% water based on the total product.

10. The method of claim 1 wherein the food product is an emulsion-simulated airy product.

11. The method of claim 1 wherein the food product is a salad dressing.

12. The method of claim 1 wherein said fat mimetic comprises a water soluble dietary fiber composition.

13. A method of preparing smooth lot fat, very low fat or fat-free emulsion-simulating dairy products with opaque appearance and non-gloppy texture from a low fat, very low fat or fat-free emulsion-simulating diary products mixture having sweetener; milk solids; up to 15% fat mimetic additive; and from 0.1 to 5% gum, comprising
   homogenizing said mixture; and
   adding to the mixture, either before or after said homogenizing, from greater than 1% to 10% tricalcium phosphate;
   all of the above percentages based on total weight of said dairy product.

14. A method of preparing smooth low fat, very low fat or fat-free emulsion-simulating salad dressing with opaque appearance and non-gloppy texture from a low fat, very low fat or fat-free emulsion-simulating salad dressing mixture having up to 15% xanthan gum comprising
   homogenizing said mixture; and
   adding to the mixture, either before or after said homogenizing, from greater than 1% to 10% tricalcium phosphate;
   all of the above percentages based on the total weight of said salad dressing.

* * * * *